INVENTORS.
CARSON D. JEFFRIES
LINN F. MOLLENAUER
BY
ATTORNEY.

United States Patent Office 3,546,575
Patented Dec. 8, 1970

3,546,575
METHOD AND APPARATUS FOR ENHANCEMENT OF NUCLEAR POLARIZATION BY OPTICAL PUMPING IN SOLIDS AND LIQUIDS
Carson D. Jeffries and Linn F. Mollenauer, Berkeley, Calif., assignors to the United States of America as represented by the United States Atomic Energy Commission
Filed Oct. 30, 1968, Ser. No. 771,795
Int. Cl. G01n 27/78
U.S. Cl. 324—.5         1 Claim

ABSTRACT OF THE DISCLOSURE

This invention is a means for producing sizable nuclear polarizations in normal density matter at both room and low temperatures. By irradiating a crystal with circularly polarized light in combination with preferential relaxation and microwave resonance, enhancement is obtained of the polarizations of nuclei in hyperfine interaction with paramagnetic ions as well as of abundant nuclei at diamagnetic sites throughout the crystal.

BACKGROUND OF THE INVENTION

This invention relates generally to the spectroscopy of solids as well as to the fields of microwave dynamic nuclear orientation and microwave paramagnetic resonance. In particular, the invention is an improved means for producing sizable nuclear polarizations in normal density matter. The invention described herein was made in the course of, or under Contract AT(11–1)–34, Project Agreement No. 20 with the Atomic Energy Commission.

Previous means of obtaining nuclear polarizations have been limited according to temperature considerations and the density of the matter. For solid matter, dynamic microwave nuclear polarization has been highly successful although it produces sizable polarizations only at low temperatures. This method requires high powered microwave oscillators, a highly uniform magnetic field, and large quantities of liquid helium, all of which make it a sufficiently expensive procedure as to limit any wide utility.

For gases and low density matter, nuclear polarizations have been very effectively and economically achieved by means of optical pumping, i.e., irradiation with circularly polarized light. In this case, however, the research applications are limited inasmuch as the low density of the gaseous matter does not lend itself as useful target material for scattering experiments.

Heretofore optical pumping has not been applicable to obtaining nuclear polarization in solid matter. This is due, basically, to the inability to pump optical transitions efficiently enough for a significant electron spin polarization to be achieved, and also to the neglect of effective use of transitions which simultaneously flip electron and nuclear spins either by relaxation or by RF fields.

SUMMARY OF THE INVENTION

The present invention combines aspects of both aforementioned methods of the prior art to obtain nuclear polarizations by optical pumping in both solids or liquids and at either low or room temperatures.

The invention involves placing the sample, either a crystal or liquid, in a magnetic field and irradiating it with circularly polarized light, as in optical pumping. In some instances, simultaneous irradiation with radio frequencies or microwave fields is also required. The angular momentum of the circularly polarized light is transferred to paramagnetic species in the sample. This electron spin polarization is then transferred, by selective hyperfine relaxation processes or by induced RF transitions, to the nuclei in the sample.

The magnitude of the nuclear polarization obtained is principally determined by ratios of optical matrix elements rather than by Boltzmann factors. Thus, in contrast to dynamic microwave polarization, the invention gives the possibility of producing sizable nuclear polarizations in solids at room temperatures.

The apparatus does not require high power microwave oscillators or the use of highly uniform magnetic fields. Thus, the invention offers advantages in economy, efficiency and simplicity over the prior art.

It is an object of the invention to provide a means for producing sizable nuclear polarization in solids for nuclear scattering experiments.

It is another object of the invention to enhance the nuclear magnetic resonance signal so as to provide a greater signal-to-noise ratio for nuclear magnetic resonance spectroscopy in applications to both solids and liquids.

It is a further object of the invention to provide an improved means for orienting radioactive nuclei in order to study beta and gamma ray anisotropies.

BRIEF DESCRIPTION OF THE DRAWING

The invention will be best understood by reference to the accompanying drawing, of which.

DESCRIPTION OF THE PREFERRED EMBODIMENT

Figure 1:
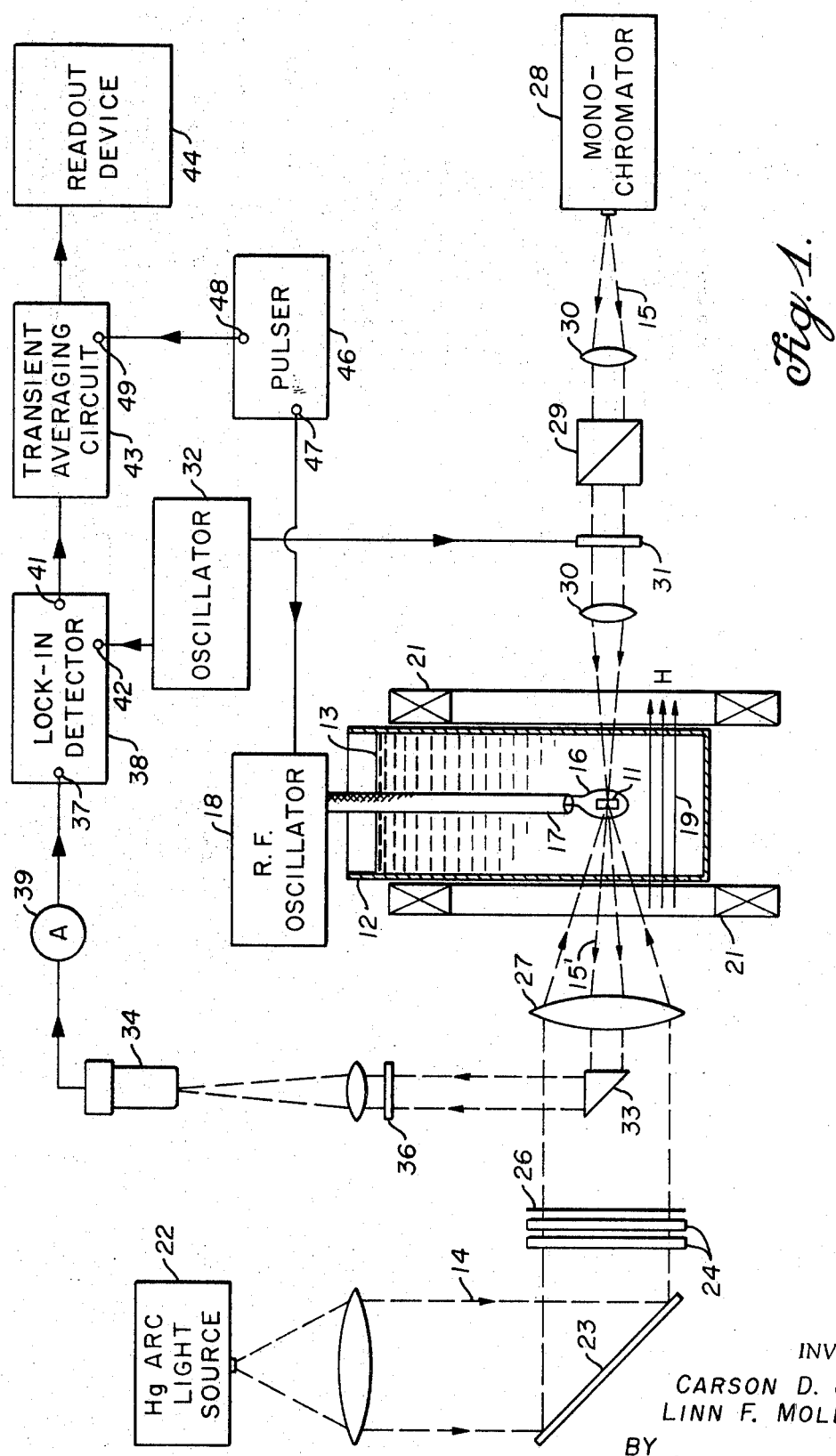
FIG. 1 is a diagrammatic view of the apparatus of the invention.

Referring now to FIG. 1, there is shown a small crystal sample 11 of the solid matter in which the nuclear polarization is to be achieved. A typical crystal 11 substance might be divalent Thulium ions diluted in a calcium fluoride crystal ($Tm^{2+}$:$CaF_2$). The crystal 11 is mounted in a dewar 12 containing low temperature helium 13 and is positioned therein at the common optic axis of two oppositely-directed light beams 14 and 15. To provide microwave irradiation of the crystal an RF loop 16 encircles the sample 11, the loop 16 being suspended into the dewar 12 by a coaxial cable 17 from an RF oscillator 18. The oscillator 18 is chosen to operate in the general range of hyperfine frequencies of the crystal 11 material, which in the present case is from 0.2 to 3 kilomegacycles. A DC magnetic field 19 is provided by a pair of Helmholtz coils 21 surrounding the dewar 12.

First light beam 14 is the optical pumping beam and provides circularly polarized light irradiation of the crystal 11. The pumping beam 14 originates from a mercury arc source 22 and is subsequently reflected from a dichroic mirror 23 to selectively filter out unwanted wavelengths therein. A pair of optical filters 24 further screen the beam 14 to comprise a wavelength band of from 5400 A. to 5800 A. and the light is then circularly polarized by polarizing screen 26. A converging lens 27 focusses the pumping beam 14 onto the sample 11 whereupon the light becomes absorbed in the crystal, inducing the energy transitions therein by which the nuclear polarizations occur.

The second light beam 15 is a monitor beam and forms part of the polarization detection system of the apparatus. The monitor beam 15 originates from a 4120 A. monochromator 28 and is directed onto the opposite side of crystal 11 by focussing lenses 30. The beam 15 is linearly polarized in a Nicol type prism 29 and circularly polarized in a quarter-wave plate 31. The quarter-wave plate 31 is fused silica, dynamically stressed, and vibrated at its mechanical resonant frequency by coupling to a 17 kc. oscillator 32. This vibration of the plate 31 alternately switches the monitor beam 15 from left- to right-hand circularly polarized light, thereby producing an AC component therein.

The monitoring beam 15 is transmitted by the crystal 11, the degree of relative transmissivity of the crystal to right-hand versus left-hand polarized light being a function of the electron polarization achieved therein. This differential transmissivity thus induces an intensity modulation on the transmitted monitor beam (indicated by beam 15' in the figure) and provides a means by which the degree of electron polarization of the crystal 11 can be measured. The nuclear polarization is subsequently determined from the electron polarization, as will hereinafter be more fully discussed.

Upon passing through the sample 11, the transmitted monitor beam 15' is directed out of the path of pumping beam 14 by a small prism 33 and onto the detecting surface of a photomultiplier tube 34. A blue filter 36 in the beam path 15' and filters 24 in pump beam 14 provide virtually complete separation of the two beams 14 and 15'. In addition, the optics of the entire monitor beam 15 and 15' are constructed to be completely free of spurious circular dichroism.

It should be noted that the optical detection means of the presently described embodiment of the invention is not in principle pertinent to the novel enhancement of nuclear polarization in solid matter taught by the invention, but is a preferred system for obtaining the measurements necessary for determining the nuclear polarization obtained by the invention for most types of crystal. An alternate detecting system could be that of a sensing coil disposed around the crystal to be used in conjunction with a nuclear magnetic resonance detector. This coil method, however is only applicable when the nuclei that are being polarized are not subject to large hyperfine fields from the paramagnetic species, as in fluorine 19, for example.

Referring again to the apparatus of FIG. 1, the output of the photomultiplier tube 34 is coupled to a first input 37 of a lock-in detector 38, through a D-C ammeter 39. Ammeter 39 reads the average current level $I_{dc}$ of the alternating left- and right-hand circularly polarized light incident on the photomultiplier tube 34. The detector 38 responds to the separate incoming current levels $I^+$ and $I^-$ of the left and right-hand circular polarizations, respectively, and algebraically combines the two signal intensities to provide a difference signal $\Delta I$ at the output 41 thereof. This output signal $\Delta I$ of the detector 38 is thus indicative of the circular dichroism S of the crystal, in view of the relationship $$S=2(I^+-I^-)/(I^++I^-)=\Delta I/I_{dc}$$

A second input 42 to the lock-in detector 38 from oscillator 32 tunes the detector to respond only to the input oscillation frequency of 17 kilocycles, thereby improving the signal-to-noise ratio of the detector output signal. The detector output 41 is connected through a transient averaging circuit 43, in which any remaining signal noise is further reduced, to a readout device 44. The readout device 44 may be in the form of either a strip chart recorder or sampling oscilloscope to record the circular dichroism S of the detector 38 output as a function of time.

A pulser circuit 46 has a first output 48 coupled to a trigger input 49 of the transient averaging circuit 43 whereby a trigger pulse to circuit 43 actuates the sampling of the dector 38 for readout on device 44. A second output 47 from pulser 46 is coupled to the RF oscillator 18 for selectively activating the RF field of loop 16 around the crystal 11. In the present example, the RF pulse duration is 8 msec. and the pulser 46 repetition period is 3–5 sec. to allow for recovery of the spin system in the crystal between samplings.

Considering how the operation of the apparatus of FIG. 1 in conjunction with the method for determining the nuclear polarization achieved, assume the crystal 11 in place in the Dewar 12 of liquid helium 13 at a known temperature T and in a know field H from coils 21. Circular dichroism S measurements are the made on the crystal 11 under various operating conditions, the measurements being determined by the transmission of the monitor beam 15 through the crystal as revealed by the output signal of the detector 38.

The first measurement is made under equilibrium conditions in which neither the pumping beam 14 nor the RF loop 16 is activated and thus there is no nuclear energizing irradiation of the crystal 11. The detector 38 output in this case measures $S_B$, the circular dichroism of the crystal at equilibrium. The optical pumping beam 14 is then activated to yield a measurement of $S_p$, circular dichroism with pumping. The electron polarization with pumping, $P_{ep}$, may now be determined from the relationship $$P_{ep}=(-g\beta H/2kT)(S_p/S_B), \text{ where } (-g\beta H/2kT)=P_{eB}$$

the spin polarization for a Boltzmann distribution in known H and T, and where $g$ is the ion spectroscopic splitting fatcor, $\beta$ is the Bohr magneton, and $k$ is Boltzmann's constant.

The enchanced polarization from the optical pumping may be transferred from the electrons to the nuclei by $I_+S_-$ relaxation or by RF saturation at the resonance frequency $\nu_{13}$, to be later discussed. Accordingly, the crystal 11 is then additionally irradiated with a saturating RF field from coil 16 at frequency $\nu_{13}$, the 8 msec. irradiation time being short compared to the optical pumping time. An instantaneous measurement made immediately after the RF pulse will yield $S_{pi13}$, the instantaneous circular dichroism with pumping and with an RF field at $\nu_{13}$. The resulting instantaneous nuclear polarization may then be determined by the relationship $$P_{ni}=(-g\beta H2kT)(2S_{pi13}-S_p)/S_B$$

Should the RF saturation be continuous at $\nu_{13}$, the invention will measure the steady signal $S_{p13}$ and the nuclear polarization $P_n$ may be determined by $$P_n=(-g\beta H/2kT)(S_{p13}/S_B)$$

It should be mentioned that $P_n$ may also be measured by combining the results of two separate pulsed RF saturation experiments at $\nu_{12}$ and $\nu_{34}$. This method requires much longer integration times for production of good signal-to-noise ratio at the output, however.

Figure 2:
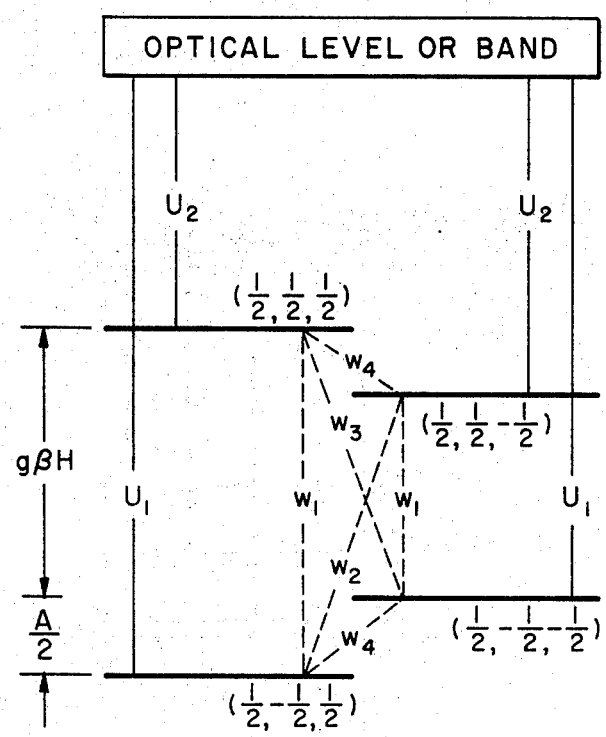
FIG. 2 is an energy level diagram for a paramagnetic ion in a high field showing the populations obtained by the invention.
Figure 3:
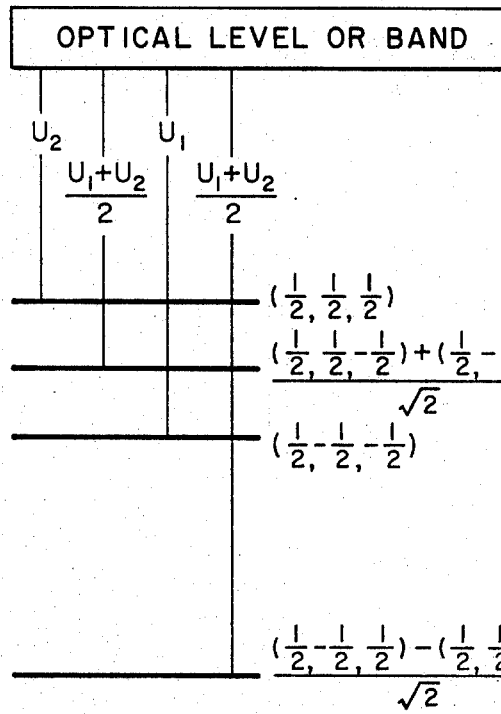
FIG. 3 is an energy level diagram for a paramagnetic ion in a low field showing the populations obtained by the invention.

Referring now to FIGS. 2 and 3 of the drawing, there is shown energy level diagrams revealing the nuclear dynamics pertaining to the invention. FIG. 2 portrays the levels and transitions for a paramagnetic ion in high field with an electron spin $S=\frac{1}{2}$ and nuclear spin $I=\frac{1}{2}$. We define $\nu_{13}$ as the frequency required to induce transistions between levels 1 and 3. The populations shown in column (a) are obtained by irradiating the crystal with circularly polarized light only and those in column (b) result from the additional presence of the RF field at frequency $\nu_{13}$ in the apparatus of FIG. 1.

For a description of the process involved assume that the crystal 11 material is magnetically dilute and at a temperature T. The crystal may contain paramagnetic ions, F centers or trapped atoms, in which the electronic ground state is represented by the spin Hamiltonian:

$$H=g\beta \vec{H}\cdot\vec{J}+A\vec{J}\cdot\vec{I}$$

The $$g\beta \vec{H} \cdot \vec{J}$$

term of the equation represents the Zeeman interaction of the ion with the external magnetic field H and, in this example, is the larger of the two terms. The second term, $$A\vec{J} \cdot \vec{I}$$

denotes the hyperfine structure (hereinafter referred to as *hfs*) interaction with the nucleus of the ion or, in the case of F centers, with a near-neighbor nucleus. The energy levels and wave functions shown are for J, $J_z$, and $I_z$, where $J=\frac{1}{2}$ and $I=\frac{1}{2}$, and the optical level is that to which the transitions are induced by illuminating the crystal with circularly polarized light.

If the crystal 11 is pumped with a beam 15 of right-hand circular polarization, the transition probabilities will be as shown in FIG. 2, where $U_2$ is significantly different from $U_1$. This difference is due to the fact that the field decouples the electron and the nucleus, and the light wave is coupled only to the electron. Consequently, the transitions obey the selection rule $\Delta J_z = +1$ and $\Delta I_z = 0$. If the ground state is $S_{1/2}$ and the excited state is $P_{1/2}$, the relative transition probabilities will be $U_1 = 2$ and $U_2 = 0$. If the excited state is $P_{3/2}$, then the probabilities will be $U_1 = 1$ and $U_2 = 3$. If both states of the LS multiplet are pumped, however, then $U_1 = U_2$. In solids where the optical lines or bands may be broad it thus requires a sufficiently large spin-orbit coupling to partially resolve the multiplets in order to selectively pump out of the ground state. In fact, in feasibility tests Faraday rotation and magnetic circular dichroism measurements show that the ratio $U_2/U_1 \approx 3$ can be obtained by pumping the 4f–5d bands in rare-earth ions; and $U_2/U_1 \approx 1.1$ to 3 in F centers in alkali halides.

In FIG. 2, $w_1$ represents the paramagnetic spin-lattice relaxation arising from the thermal modulation of the crystalline electric fields, and $w_2$ and $w_3$ represent relaxation arising from modulation of the *hfs* interaction $A'(t)(J_+I_- + J_-I_+)$, which makes $w_2 \gg w_3$. The occurrence of this preferential relaxation makes the Overhauser effect possible. This phenomena is discussed more fully by A. Overhauser in Physical Review 89, p. 689 (1953) and by A. Abragam in Physical Review 98, p. 1729 (1955).

Considering now the downward relaxation from the optical level, a first postulation is based on nuclear spin memory. Theoretically this implies that the ions optically pumped out of the left-hand side of FIG. 2 ($I_z = +\frac{1}{2}$) will decay to the left-hand side before thermalization can occur and ions of the right-hand side will return to the right. The essential effect of pumping with circularly polarized light in competition with $w_1$ is to establish the relative populations shown in column (a), where $g \approx U_1/U_2$ for strong pumping and $\alpha$ is to be determined by the relaxations $w_2$ and $w_3$. For $w_2 \gg w_3$, thermal equilibrium requires that $\alpha q = \exp(-g\beta H/kT) \equiv \exp(-\Delta)$. This ideal case of enhancement of nuclear polarization by optical pumping thus yields a nuclear polarization (p), the magnitude of which may be determined by the relationship $$p = \frac{n_1 + n_4 - n_2 - n_3}{n_1 + n_4 + n_2 + n_3} = \frac{q - \exp(-\Delta)}{q + \exp(-\Delta)} \qquad (1)$$

This assumes that the population of the optical level remains negligible.

Solution of the rate equations for arbitrary light intensity yields the relationship $$p = \frac{(U_1/w_1) - (U_2/w_1)\exp(-\Delta)}{4\exp(-\frac{1}{2}\Delta) + (U_1/w_1)\exp(-\Delta)} \qquad (2)$$

Half-saturation occurs for $U \sim T_{1e}^{-1}\exp(-\frac{1}{2}\Delta)$, where $T_{1e}^{-1}$ is the ground-state relaxation rate.

At very low temperatures, where $q \gg \exp(-\Delta)$, Equation 1 shows that the nuclear polarization is essentially complete and obtains even if $q=1$ (the case for unpolarized light) and even if $U_1 = U_2$. At high temperatures, $\exp(-\Delta) \approx 1$ and Equation 1 becomes $$p = (q-1)/(q+1) \qquad (3)$$

showing that a large polarization can be obtained even at room temperatures.

Reversing the light polarization of beam 15 requires that $q \rightarrow 1/q$, which reverses the sign of $p$. For an RF oscillator 18 strength near unity and for moderate pumping intensities ($\sim$ one watt/cm.²) of beam 15, it is possible to achieve $U \sim 10^5$ sec.$^{-1}$, which is comparable with $T_{1e}^{-1}$ for favorable substances at room temperature. If it is not certain that $w_2 \gg w_3$, then it is feasible to saturate the forbidden microwave transition $$(\frac{1}{2}, \frac{1}{2}, -\frac{1}{2}) \leftrightarrow (\frac{1}{2}, -\frac{1}{2}, \frac{1}{2})$$

This together with optical pumping will lead to the populations of column (b) in FIG. 2. The magnitude of polarization in this case is given by Equation 3 which, it should be noted, will again be large and independent of temperature.

In view of the foregoing and of Equations 1 and 3 in particular, it can be seen that the magnitude of the nuclear polarization produced is determined by ratios of the optical matrix elements rather than by Boltzmann factors. Thus, in contrast to dynamic microwave polarization, the present invention gives the possibility of producing sizable nuclear polarizations in solids at room temperature.

A second postulation concerning the downward relaxation from the optical band of FIG. 2 assumes randomized optical relaxation. In this instance it is presumed that ions in the optical band relax with equal probability to the four ground levels. Solution of the rate equations shows that very strong optical pumping yields no nuclear polarization because the optical relaxation in effect short circuits the relaxations $w_2$ and $w_3$. However, at intermediate light intensities, a polarization is obtained if $w_1 \approx w_2 \gg w_3$, a requirement which is met in F centers, for example. As an alternative, the forbidden microwave transition can be saturated, thereby yielding again the polarization of Equation 3.

It is also possible to transfer the polarization of the rather few nuclei of the ions to the abundant nuclei I' at diamagnetic sites in the crystal by cross relaxation, for instance, by operation in a field such that $g_n'\beta H = \frac{1}{2}A$. It is well known in the art that under such circumstances the polarization will diffuse throughout the sample by rapid mutual spin flips. Alternatively, the field of the RF coil 16 could be pulsed on to this value simultaneously with an intense light pulse from beam 15, thereby making an optically pumped nuclear-spin refrigerator.

Referring now to FIG. 3, the energy levels and transitions are shown for a paramagnetic ion in a very low field with $S=\frac{1}{2}$ and $I=\frac{1}{2}$. Also indicated are the populations obtained by the invention. For an understanding of the processes involved in this low field case, assume the same magnetically dilute crystal 11 material and conditions referred to for the high field example of FIG. 2. In this case, however, consider the *hfs* term $A\vec{J} \cdot \vec{I}$ of the spin Hamiltonian $$H = g\beta \vec{H} \cdot \vec{J} + A\vec{J} \cdot \vec{I}$$

to be much larger than the Zeeman effect. The admixing by the *hfs* puts an optical handle on the nuclear spins, causing the transition probabilities shown.

If the crystal 11 is strongly pumped with right-hand circularly polarized light, for instance, the populations of FIG. 3 will obtain for randomized optical relaxation. There will also be no restriction on the relative magnitudes of spin-lattice relaxation rates within the ground state. In this case the invention yields a nuclear polarization $$p = \frac{n_4 - n_2}{n_1 + n_2 + n_3 + n_4} = \frac{U_2^{-1} - U_1^{-1}}{4(U_1 + U_2)^{-1} + U_2^{-1} + U_1^{-1}} \quad (4)$$

This is a sizable effect, which is temperature independent and also reversible by using left-hand polarized light.

With respect to dipolar coupling, for a paramagnetic ion or atom in dipole-dipole coupling with the nucleus of a neighboring diamagnetic atom, the high field levels are similar to those of FIG. 2. Since $w_2 = w_3$ for dipolar coupling in solids, it is not generally possible to achieve a polarization by optical pumping alone. However, by also saturating the forbidden microwave transition $$(½, ½, -½) \leftrightarrow (½, -½, ½)$$

the populations of FIG. 2, column (b), result, with a polarization given by Equation 3. Accordingly, a further possible advantage of the invention in this usage over straight microwave dynamic polarization is that it will give large nuclear polarizations at room temperature, which polarization can be very rapidly reversed by reversal of the light polarization.

The basic ideas of the aforementioned means for enhancement of nuclear polarizations in solids by optical pumping can readily be extended to liquids containing paramagnetic ions or other magnetic species, provided that $U_1$ and $U_2$ can be made sufficiently different. This provision usually requires large spin-orbit coupling and that the oscillator strength and available light intensity combine to give $U \sim T_{1e}^{-1}$, as is necessary for optical saturation. The nuclei of interest are those in the abundant diamagnetic solvent molecules, either of the *hfs* form $$\vec{I} \cdot A \cdot \vec{S}$$

or of the dipole-dipole form.

If the interaction is in the *hfs* form, the case is similar to that of the previously-described nuclear spin memory situation, except that the *hfs* is averaged out. However, $w_2 \gg w_3$ if the *hfs* fluctuation is nearly isotropic. Therefore, if nuclear-spin memory exists, then pumping the liquid with circularly polarized light will yield the nuclear polarizations of Equation 3. If the interaction is of the dipolar form, in all probability the nuclear polarization will be reversed due to the fact that in liquid $$w_2 : w_3 : w_4 = 2 : 12 : 3$$

While the invention has been described with respect to certain particular embodiments thereof, it will be apparent to those skilled in the art that numerous other variations and modifications are possible within the spirit and scope of the invention and thus it is not intended to limit the invention except as defined in the following claim.

What is claimed is:

1. In an apparatus for producing polarization in normal density matter, wherein a crystal of said matter is disposed within a direct current magnetic field, means for enhancing the polarization of nuclei in said crystal of normal density matter comprising in combination:
   (a) an optical pump disposed to irradiate said crystal with a beam of circularly polarized light therefrom directed parallel to said magnetic field;
   (b) a coil having at least one turn therein disposed to encircle said crystal;
   (c) an RF pulse source coupled to said coil to selectively irradiate said crystal with microwave radiation in combination with irradiation by said beam of circularly polarized light, whereby electron spin polarization produced in said crystal by said light beam is transferred to certain near nuclear spins therein;
   (d) detection means sensing the electron polarization produced in said crystal, whereby the nuclear polarization of said crystal may be determined, said detection means comprising: a monochromatic light source having a monitor light beam directed at said crystal parallel to said magnetic field; a polarizer disposed in said monitor light beam near said light source and having means for effecting alternating right-hand and left-hand circular polarization of said beam; a photomultiplier tube disposed to receive on the photosensitive surface thereof the portion of said monitor light beam transmitted by said crystal, whereby said photomultiplier tube produces an AC output signal, the alternate positive and negative peak values of which correspond respectively to the in-right-hand and left-hand circularly polarized light; a pulse detector coupled to the output of said photomultiplier tube and algebraically combining said positive and negative signal values to produce a difference signal at the output thereof; and an ammeter coupled to the output of said photomultiplier tube to measure the DC average of said AC output signals therefrom, whereby the instantaneous electron polarization of said crystal may be determined from the ratio of said pulse detector output signal to said ammeter reading.

References Cited

Optical Detection of Paramagnetic Resonance Saturation in Ruby, I. Wieder, Phys. Rev. Letters, 3(10), Nov. 15, 1959, pp. 468–470.

MICHAEL J. LYNCH, Primary Examiner